UNITED STATES PATENT OFFICE.

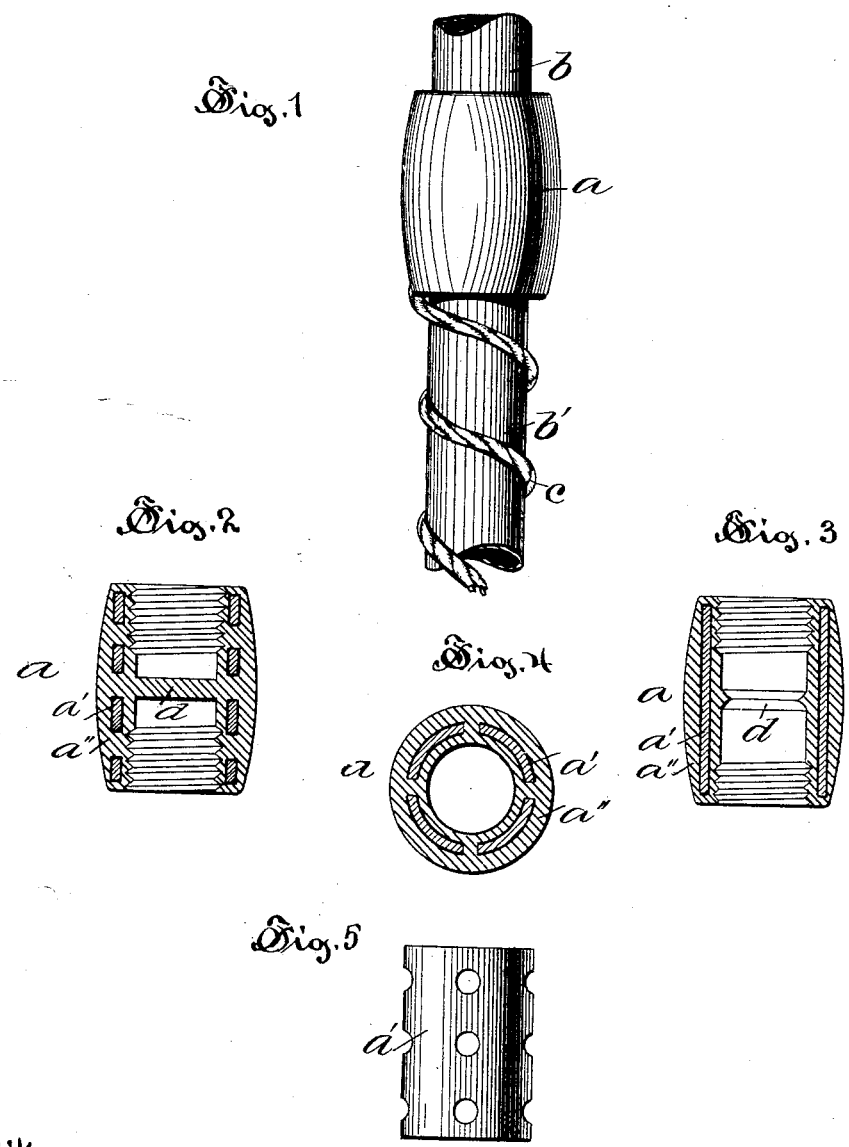

FREDERICK C. ROCKWELL, OF HARTFORD, CONNECTICUT.

INSULATING PIPE-COUPLING.

SPECIFICATION forming part of Letters Patent No. 400,600, dated April 2, 1889.

Application filed January 26, 1889. Serial No. 297,650. (No model.)

*To all whom it may concern:*

Be it known that I, FREDERICK C. ROCKWELL, of Hartford, Connecticut, have invented certain new and useful Improvements in Insulating Pipe-Couplings, of which the following is a specification.

The invention relates to the class of couplings intended to join a pipe, bearing either externally or internally wires conducting electricity to a pipe which it is necessary to protect from becoming charged with electricity.

The object of the invention is to provide a simple, cheap, and strong coupling which will rigidly connect two pipes and prevent any possible chance of the passage of electricity from one pipe to the other.

In the accompanying drawings, Figure 1 is a view of a portion of the ends of two pipes joined by my coupling. Fig. 2 is a view in central vertical section of the coupling. Fig. 3 is a like sectional view of a modified form. Fig. 4 is a view in horizontal cross-section. Fig. 5 is a view of the core which forms the foundation of the coupling.

In the drawings, $a$ denotes the coupling, into which the threaded ends of the pipes $b$ $b'$ are screwed, the pipe $b$ representing the end of the gas-piping system of a building and the pipe $b'$ the end of the chandelier.

$c$ are the conducting-wires leading to an electric lamp, which wires may be twisted around the exterior or pass through the interior of the pipe.

It has been found that a coupling formed of a composition of insulating materials solidified by heat and pressure which has the requisite degree of hardness to enable it to be threaded to receive the pipe ends is brittle, and has not the proper tenacity to stand the strain to which a coupling is subjected, particularly where the chandelier is suspended by a long rod and is inclined to vibrate, the vibration and the changes of temperature causing such a composition to crack and crumble. It is also necessary to prevent any chance of the ends of the pipe from coming into direct contact or from being so located that conducting matter will collect on one and bridge to the other, forming a path for a current. To overcome these objections and to simplify the construction of the coupling, a tubular core, $a'$, is formed somewhat larger in diameter than the pipes to be joined, preferably of cheap metal, as iron, which is perforated or otherwise roughened, so a composition will adhere to its surface. This core $a'$ is embedded in a composition of insulating materials consisting of a gum, as rubber or shellac, a hardening agent, as sulphur, and an earthy material, as asbestus, in a mold and subjected to heat and pressure to harden and solidify the mass. The ends may then be threaded to receive the pipe. If the core is perforated, the substance when heated and pressed flows through the perforations, forming a homogeneous mass, $a''$, entirely surrounding the core $a'$. If the coupling is intended to join pipe which are not to have matter flowing through them, a central integral diaphragm, $d$, can be left to strengthen the coupling and prevent the ends of the pipe from being screwed so far in as to make contact. This diaphragm may at any time be broken out, if it is desired to use the pipes for gas, as shown in Fig. 3. This construction gives the coupling the strength of a metallic coupling and the dielectric capacity of the best insulators without danger of breaking or crumbling when in use. It makes a tight joint, and is capable of a high finish, and being formed in a single piece there are no parts to work loose when subjected to continual vibration, as from machinery, so as to wear away the insulating material and make a conducting-joint between the pipes.

I claim as my invention—

1. The herein-described pipe-coupling, consisting of a tubular core of rigid material and an exterior body of insulating material, the ends of the dielectric body being threaded to receive the ends of pipes, as specified.

2. The herein-described pipe-coupling, consisting of a cylindrical metallic core with an exterior body of insulating material compressed around the core, as specified.

3. The herein-described pipe-coupling, consisting of a perforated metallic core, $a'$, a body, $a''$, of insulating material, and an integral insulating-diaphragm, $d$, substantially as specified.

FREDERICK C. ROCKWELL.

Witnesses:
HARRY R. WILLIAMS,
A. B. JENKINS.